No. 670,359. Patented Mar. 19, 1901.
W. H. JENKINS.
NUT AND BOLT LOCK.
(Application filed Oct. 18, 1899.)
(No Model.)
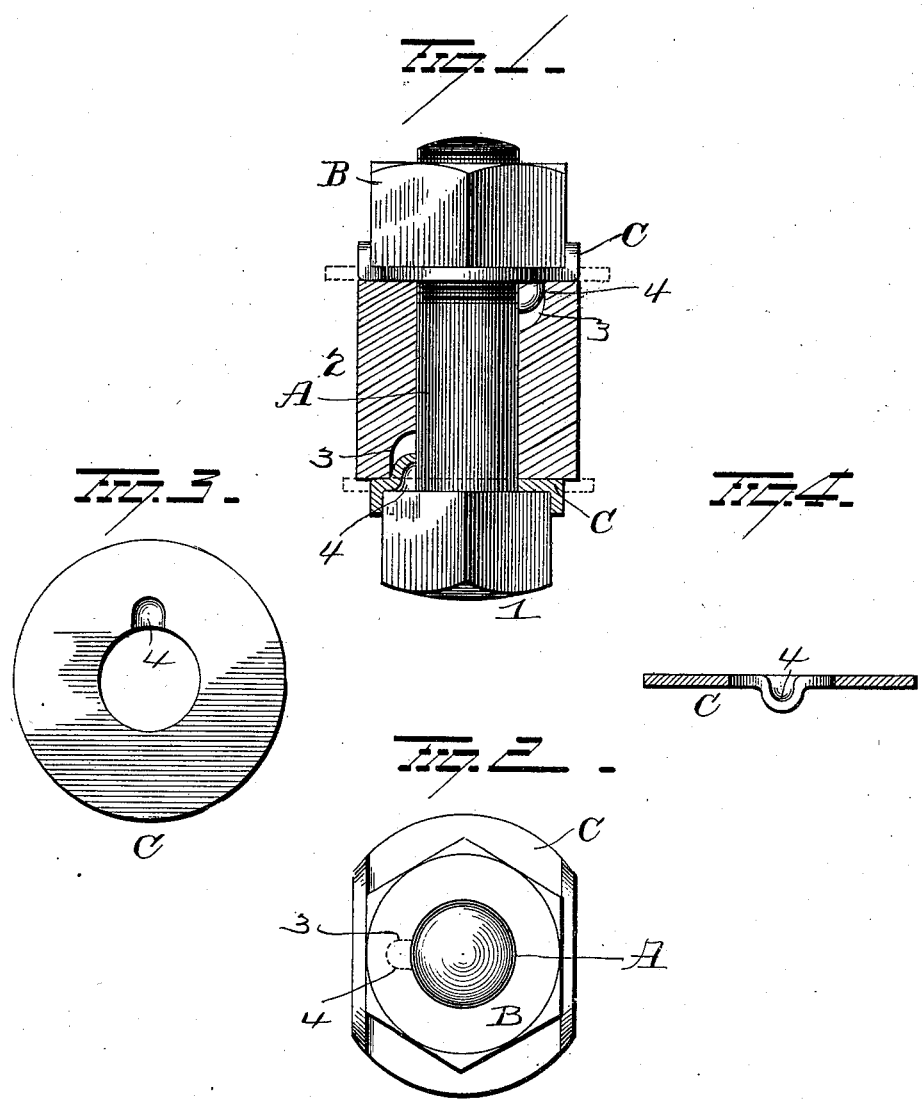

UNITED STATES PATENT OFFICE.

WILLIAM HENRY JENKINS, OF PHILADELPHIA, PENNSYLVANIA.

NUT AND BOLT LOCK.

SPECIFICATION forming part of Letters Patent No. 670,359, dated March 19, 1901.

Application filed October 18, 1899. Serial No. 734,020. (No model.)

*To all whom it may concern:*

Be it known that I, WILLIAM HENRY JENKINS, a resident of Philadelphia, in the county of Philadelphia and State of Pennsylvania, have invented certain new and useful Improvements in Nut and Bolt Locks; and I do hereby declare the following to be a full, clear, and exact description of the invention, such as will enable others skilled in the art to which it appertains to make and use the same.

My invention relates to an improvement in nut and bolt locks, the object of the invention being to provide an improved washer for securing a bolt and nut against movement, which washer can be readily operated to lock a bolt and nut against movement and as readily operated to unlock the bolt and nut and permit their removal.

With this object in view the invention consists in certain novel features of construction and combinations and arrangements of parts, as will be more fully hereinafter described, and pointed out in the claims.

In the accompanying drawings, Figure 1 is a view in elevation, illustrating my improvements. Fig. 2 is a plan view of the nut and washer, and Figs. 3 and 4 are enlarged detail views of the washer.

A represents a bolt, of ordinary construction, having the usual head 1 and screw-threaded at its other end for the reception of an ordinary nut B.

The bolt A is passed through a hole in the bar or plate 2, and said bar or plate 2 is made at each side with a recess 3, communicating with the bolt-hole, and my improved locking-washers C are disposed between the bar or plate 2 and the head 1 and nut B. Each washer C is made, preferably, of malleable metal, of any shape desired, and is provided with a central opening for the passage of the bolt A. Each washer C is depressed at one side of its central opening to form an inwardly-projecting lug 4, which is disposed in the recess 3 in the bar or plate, and when the nut B is screwed home the sides of the washers C are bent up around the angular sides of the nut B and bolt-head 1 and effectually prevent independent movement of either. The lug or projection 4 of one washer is crowded against the bolt by the wall of the recess 3, which it enters, and the pressure of the head 1 of the bolt and the lug or projection 4 of the other washer is crowded against the threaded end of the bolt by the wall of the recess which it enters and the pressure of the nut B.

When it is desired to remove the nut or bolt, the edges of the washers C are bent back to their original shape, and the nut and bolt can be readily removed.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a bolt and a device which the bolt enters, said device having a recess communicating with the hole which the bolt enters, of a washer having a lug entering said recess and an enlarged part on the bolt bearing against the washer, the lug on the washer and the recess which it enters being so constructed that the pressure of the said enlarged part and the wall of the recess coöperate to crowd the lug against the bolt.

2. The combination with a bolt having a head on one end and a device through which the bolt passes, said device having a recess in each face communicating with the hole extending through it, of a malleable washer disposed between the head of the bolt and the device through which the bolt passes and having an integral lug entering the recess in the adjacent face of said device and crowded against the bolt by the wall of said recess and the pressure of the head of the bolt, the said washer adapted to be bent up to engage the head on the bolt to prevent the latter from turning, a nut on the other end of the bolt, a washer between the nut and the device through which the bolt passes and having a lug entering the recess in the adjacent face of said device and crowded against the threaded end of the bolt by the wall of said recess and the pressure of the nut, said washer to be bent up alongside the nut to prevent the latter from turning.

In testimony whereof I have signed this specification in the presence of two subscribing witnesses.

WILLIAM HENRY JENKINS.

Witnesses:
ADOLPH REDEKER,
VIOLET M. McKNETT.